US012095174B2

(12) United States Patent
Lee et al.

(10) Patent No.: US 12,095,174 B2
(45) Date of Patent: Sep. 17, 2024

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Young Jun Lee, Seoul (KR); Jong Min Kim, Gyeonggi-do (KR); Yoon Ho Huh, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 155 days.

(21) Appl. No.: 17/751,917

(22) Filed: May 24, 2022

(65) Prior Publication Data

US 2022/0285840 A1 Sep. 8, 2022

Related U.S. Application Data

(63) Continuation of application No. PCT/KR2020/016546, filed on Nov. 23, 2020.

(30) Foreign Application Priority Data

Nov. 25, 2019 (KR) ........................ 10-2019-0152628

(51) Int. Cl.
*H01Q 5/30* (2015.01)
*H01Q 1/38* (2006.01)
*H01Q 1/48* (2006.01)

(52) U.S. Cl.
CPC ................. *H01Q 5/30* (2015.01); *H01Q 1/38* (2013.01); *H01Q 1/48* (2013.01)

(58) Field of Classification Search
USPC .................................................... 343/700 MS
See application file for complete search history.

(56) References Cited

U.S. PATENT DOCUMENTS

2002/0196192 A1* 12/2002 Nagumo ................ H01Q 5/392
343/702

FOREIGN PATENT DOCUMENTS

| | | | |
|---|---|---|---|
| CN | 101330167 | A | 12/2008 |
| CN | 101577366 | A | 11/2009 |
| CN | 103346393 | A | 10/2013 |
| CN | 103682578 | A * | 3/2014 |
| CN | 108023174 | A | 5/2018 |
| EP | 1 758 203 | A1 | 2/2007 |
| EP | 2 093 890 | A1 | 8/2009 |

(Continued)

OTHER PUBLICATIONS

Notice of Allowance issued on Nov. 24, 2022 from Korean Patent Office in a counterpart Korean Patent Application No. 10-2021-0033819 (all the cited references are listed in this IDS.) (English translation is also submitted herewith.).

(Continued)

*Primary Examiner* — Hoang V Nguyen
*Assistant Examiner* — Brandon Sean Woods
(74) *Attorney, Agent, or Firm* — The PL Law Group, PLLC

(57) ABSTRACT

An antenna device according to an embodiment of the present invention includes a dielectric layer, a radiator disposed on a top surface of the dielectric layer, a transmission line connected to a side of the radiator on the dielectric layer, a signal pad connected to an end portion of the transmission line, a ground pad disposed around the signal pad, and an auxiliary radiator extending from the ground pad to be parallel to the transmission line.

14 Claims, 7 Drawing Sheets

(56) References Cited

FOREIGN PATENT DOCUMENTS

| | | | | | |
|---|---|---|---|---|---|
| IN | 101283481 | A | | 10/2008 | |
| JP | 11068454 | A | * | 3/1999 | ............. H01Q 1/243 |
| JP | 2004-112397 | A | | 4/2004 | |
| JP | 2007-060386 | A | | 3/2007 | |
| KR | 10-2009-0065649 | A | | 6/2009 | |
| KR | 10-2013-0032979 | A | | 4/2013 | |
| KR | 10-1744886 | B1 | | 6/2017 | |
| KR | 10-2017-0094741 | A | | 8/2017 | |
| KR | 10-2018-0099234 | A | | 9/2018 | |
| KR | 10-1940797 | B1 | | 1/2019 | |
| KR | 10-1962821 | B1 | | 7/2019 | |
| KR | 10-2019-0108464 | A | | 9/2019 | |
| WO | WO 2006/038432 | A1 | | 4/2006 | |
| WO | WO 2019/143190 | A1 | | 7/2019 | |
| WO | WO-2020022717 | A1 | * | 1/2020 | ........... G06F 1/1626 |

OTHER PUBLICATIONS

International Search Report for PCT/KR2020/016546 mailed on Mar. 8, 2021.

Office action issued on Aug. 21, 2020 from Korean Patent Office in a counterpart Korean Patent Application No. 10-2019-0152628 (all the cited references are listed in this IDS.) (English translation is also submitted herewith.).

Notice of Allowance issued on Dec. 17, 2020 from Korean Patent Office in a counterpart Korean Patent Application No. 10-2019-0152628 (all the cited references are listed in this IDS.) (English translation is also submitted herewith.).

* cited by examiner

ANTENNA DEVICE AND DISPLAY DEVICE INCLUDING THE SAME

CROSS-REFERENCE TO RELATED APPLICATION AND CLAIM OF PRIORITY

The present application is a continuation application to International Application No. PCT/KR2020/016546 with an International Filing Date of Nov. 23, 2020, which claims the benefit of Korean Patent Applications No. 10-2019-0152628 filed on Nov. 25, 2019 at the Korean Intellectual Property Office, the disclosures of which are incorporated by reference herein in their entirety.

BACKGROUND

1. Field

The present invention relates to an antenna device and a display device including the same. More particularly, the present invention relates to an antenna device including an electrode and a dielectric layer, and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device.

Further, as the display device equipped with the antenna becomes thinner and light-weighted, a space for the antenna may be also decreased. Accordingly, a high frequency and broadband signal transmission and reception may not be easily implemented in a limited space.

For example, in a recent 5G high frequency band communication, as a wavelength becomes shorter, the signal transmission and reception may be blocked. Thus, a multi-band signaling may be needed.

Further, when a film or patch type antenna is applied in the display device, a radiation reliability in the high frequency or ultra-high frequency communication may be required even from a thin-layered antenna construction.

For example, Korean Published Patent Application No. 2010-0114091 discloses a dual patch antenna module, which may not be suitable to be applied to a thin and compact device.

SUMMARY

According to an aspect of the present invention, there is provided an antenna device having improved gain and signaling efficiency.

According to an aspect of the present invention, there is provided a display device including an antenna device with improved gain and signaling efficiency.

(1) An antenna device, including: a dielectric layer; a radiator disposed on a top surface of the dielectric layer; a transmission line connected to a side of the radiator on the dielectric layer; a signal pad connected to an end portion of the transmission line; a ground pad disposed around the signal pad; and an auxiliary radiator extending from the ground pad to be parallel to the transmission line.

(2) The antenna device according to the above (1), wherein the antenna device satisfies Equation 1 below:

$$0.3<D_2/D_1<0.99 \quad \text{[Equation 1]}$$

wherein, in Equation 1, $D_1$ is a length of the transmission line and $D_2$ is a length of the auxiliary radiator.

(3) The antenna device according to the above (1), wherein the auxiliary radiator is electrically and physically separated from the radiator and the transmission line.

(4) The antenna device according to the above (1), wherein the ground pad includes a pair of ground pads facing each other with the signal pad interposed therebetween.

(5) The antenna device according to the above (4), wherein the auxiliary radiator extends from each of the pair of ground pads.

(6) The antenna device according to the above (1), wherein the auxiliary radiator is a single member integrally connected to the ground pad.

(7) The antenna device according to the above (6), wherein the auxiliary radiator has the same shape as that of the ground pad, and has an internal structure different from that of the ground pad.

(8) The antenna device according to the above (7), wherein the auxiliary radiator has an area larger than that of the ground pad.

(9) The antenna device according to the above (7), wherein the auxiliary radiator has a mesh structure, and the ground pad has a solid pattern structure.

(10) The antenna device according to the above (9), further comprising a dummy mesh pattern on the dielectric layer to be disposed around the radiator and the auxiliary radiator.

(11) The antenna device according to the above (1), wherein the auxiliary radiator has a width smaller than that of the ground pad.

(12) The antenna device according to the above (1), wherein the radiator and the auxiliary radiator are disposed at the same layer.

(13) The antenna device according to the above (1), further including a ground layer formed on a bottom surface of the dielectric layer.

(14) The antenna device according to the above (13), wherein the ground layer covers the auxiliary radiator and the radiator in a planar view with the dielectric layer interposed therebetween.

(15) The antenna device element of the above (11), wherein a resonance frequency of the auxiliary radiator is greater than a resonance frequency of the radiator.

(16) A display device comprising the antenna device according to embodiments as described above.

According to exemplary embodiments of the present invention, an antenna device may include a radiator and an auxiliary radiator extending to be parallel to a transmission line from a ground pad on a top surface of the dielectric layer. Accordingly, a frequency at which the antenna device is operated may be adjusted, and the antenna device capable of transmitting and receiving high-frequency or ultra-frequency and broadband signals in a limited space may be implemented.

In some embodiments, the auxiliary radiator may be formed at the same layer as that of the radiator. Accordingly, interference and signal disturbance due to a parasitic capacitance may be prevented, and a thin dual-band antenna device formed as a single antenna unit-layered structure may be implemented Additionally, the radiator and the auxiliary radiator may include a mesh structure. Accordingly, a transmittance of the antenna device may be improved, and a visual recognition of the antenna device to a user may be prevented when being applied to a display device.

The antenna device may be applied to a display device including a mobile communication device capable of transmitting and receiving a high-frequency/ultra-high frequency band of 3G, 4G, 5G or higher, thereby improving optical properties such as transmittance and radiation properties.

DETAILED DESCRIPTION OF THE EMBODIMENTS

According to exemplary embodiments of the present invention, there is provided an antenna device including a dielectric layer and an antenna unit layer that includes a radiator and an auxiliary radiator.

The antenna device may be, e.g., a microstrip patch antenna fabricated in the form of a transparent film. The antenna device may be applied to communication devices for a mobile communication of a high or ultrahigh frequency band corresponding to a mobile communication of, e.g., 3G, 4G, 5G or more.

According to exemplary embodiments of the present invention, there is also provided a display device including the antenna device. An application of the antenna device is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying drawings, two directions parallel to a top surface of a dielectric layer 90 and crossing each other are defined as a first direction and a second direction. For example, the first direction and the second direction may be perpendicular to each other. A direction vertical to the top surface of the dielectric layer 90 is defined as a third direction. For example, the first direction may correspond to a length direction of the antenna device, the second direction may correspond to a width direction of the antenna device and a third direction may correspond to a thickness direction of the antenna device.

Figure 1:
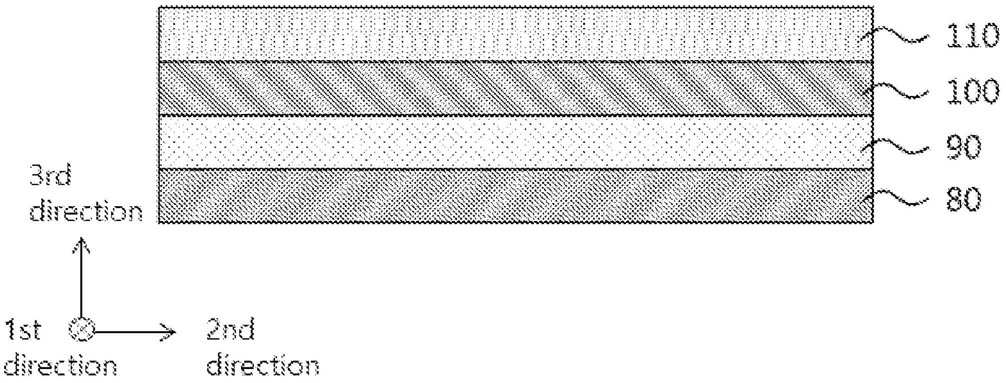
FIG. 1 is a schematic cross-sectional view illustrating an antenna device in accordance with exemplary embodiments.

FIG. 1 is a schematic cross-sectional view illustrating an antenna device in accordance with exemplary embodiments.

Referring to FIG. 1, the antenna device may include a dielectric layer 90 and an antenna unit layer 100 disposed on the dielectric layer 90.

The dielectric layer 90 may include, e.g., a transparent resin material. For example, the dielectric layer 90 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), or the like may be included in the dielectric layer 90.

In some embodiments, the dielectric layer 90 may include an inorganic insulating material such as glass, silicon oxide, silicon nitride, silicon oxynitride, etc.

In some embodiments, the dielectric layer 90 may be provided as a substantially single layer. In an embodiment, the dielectric layer 90 may include a multi-layered structure including at least two layers.

Capacitance or inductance may be formed between the antenna unit layer 100 and a ground layer 80 by the dielectric layer 90, so that a frequency band at which the antenna device may be driven or operated may be adjusted. n some embodiments, a dielectric constant of the dielectric layer 90 may be adjusted in a range from about 1.5 to about 12. When the dielectric constant exceeds about 12, a driving frequency may be excessively decreased, so that driving in a desired high frequency band may not be implemented.

The antenna unit layer 100 may be disposed on a top surface of the dielectric layer 90. The antenna unit layer 100 may include an antenna unit of the antenna device. The antenna unit may include a radiator 120, a transmission line 130, a pad electrode 145, and an auxiliary radiator 150. Detailed constructions of the antenna unit layer 100 including the antenna unit will be described later with reference to FIG. 2.

In exemplary embodiments, the antenna unit layer 100 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

For example, the radiator 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit layer 100 may include a transparent conductive oxide such as indium tin oxide (ITO), indium zinc oxide (IZO), indium zinc tin oxide (ITZO), zinc oxide (ZnOx), etc. For example, the antenna unit layer 100 may have a multi-layered structure including at least one metal or alloy layer, and a transparent metal oxide layer.

The antenna device may further include an upper dielectric layer 110 on the antenna unit layer 100.

The upper dielectric layer 110 may include an insulating material having a predetermined dielectric constant. For example, the upper dielectric layer 110 may include an inorganic insulating material such as glass, silicon oxide, silicon nitride, a metal oxide, etc., or an organic insulating material such as an epoxy resin, an acrylic resin, an imide-based resin, etc. In some embodiments, the dielectric layer 90 and the upper dielectric layer 110 may include substantially the same material.

In some embodiments, a ground layer 80 may be formed on a bottom surface of the dielectric layer 90. The ground layer 80 may be disposed to entirely cover the radiator 120 and the auxiliary radiator 150 in a planar view. Accordingly, a vertical radiation property may be implemented from the antenna device.

In an embodiment, a conductive member of a display device to which the antenna device may be applied may serve as the ground layer 80. For example, the conductive member may include various wirings or electrodes such as a gate electrode, a source electrode, a drain electrode, a pixel electrode, a common electrode, a data line, a scan line, etc., included in a thin film transistor (TFT) array panel.

In an embodiment, a metallic member such as a SUS plate, a sensor member such as a digitizer, a heat dissipation sheet, etc., disposed at a rear portion of the display device may serve as the ground layer 80.

Figure 2:
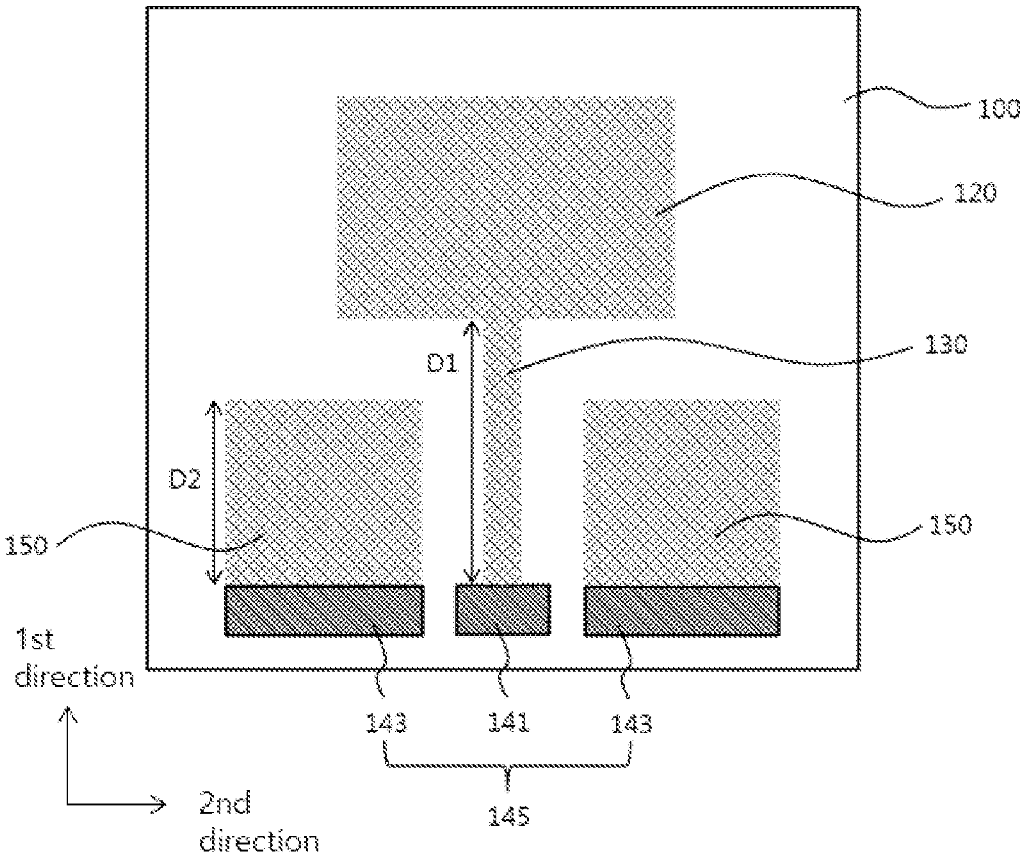
FIG. 2 is a schematic top planar view illustrating an antenna device in accordance with some exemplary embodiments.

FIG. 2 is a schematic top planar view illustrating an antenna device in accordance with some exemplary embodiments.

Referring to FIG. 2, the antenna device may include the antenna unit layer 100 formed on a top surface of the dielectric layer 90, and the antenna unit layer 100 may include an antenna unit.

The antenna unit layer 100 may include a radiator 120, a transmission line 130, a signal pad 141 and a ground pad 143, and may include an auxiliary radiator 150 extending from the ground pad 143 to be parallel to the transmission line 130.

In exemplary embodiments, a pad electrode 145 may include the signal pad 141 electrically connected to the radiator 120, and the ground pad 143 disposed around the signal pad 141 to be electrically and physically separated from the signal pad 141. For example, a pair of the ground pads 143 may be disposed to face each other in the second direction with the signal pad 141 interposed therebetween.

The pad electrode 145 may be attached or bonded to a driving circuit unit. For example, the driving circuit unit may include a flexible circuit board (FPCB), and may be electrically connected to the pad electrode 145 through a conductive intermediate structure such as an anisotropic conductive film (ACF). Accordingly, signal transmission/reception may be implemented between the antenna unit and the driving circuit unit.

In an embodiment, the pad electrode 145 may have a solid structure in the form of a thin transparent metal layer. Accordingly, a contact resistance between the pad electrode 145 and the driving circuit unit may be reduced, and a feeding and power supply efficiency may be further improved.

In exemplary embodiments, the radiator 120 may have a polygonal plate shape. The shape of the radiator 120 of FIG. 2 may be merely an example, and may be appropriately changed in consideration of a radiation efficiency.

The transmission line 130 may be branched from the radiator 120 to be electrically connected to the signal pad 141. In this case, the transmission line 130 may be formed as a single member substantially integral with the radiator 120.

The auxiliary radiator 150 may be physically spaced apart from the radiator 120 and the transmission line 130, and may be disposed at the same layer as that of the radiator 120 and the transmission line 130. The auxiliary radiators 150 may each extend from a pair of the ground pads 143.

Accordingly, the ground pad 143 and the auxiliary radiator 150 may be formed as a single member integrally connected to each other. In this case, a width of the auxiliary radiator 150 may be equal to a width of the ground pad 143. The width of the auxiliary radiator 150 may be smaller than a width of the ground pad 143.

The auxiliary radiator 150 may have the same shape as that of the ground pad 143. For example, when the ground pad 143 has a square shape, the auxiliary radiator 150 may also have a square shape. The same shape means that an outer shape is the same, and a size and an area may be different or the same.

The auxiliary radiator 150 may have an internal structure different from that of the ground pad 143. For example, the auxiliary radiator 150 may have an internal structure of a mesh pattern, and the ground pad 143 may have an internal structure of a solid pattern shape. The internal structure may refer to an inner pattern filling peripheries of radiator 120 and the auxiliary radiator 150.

The auxiliary radiator 150 and the radiator 120 may be formed at the same level (at the same layer) on the top surface of the dielectric layer 90. Thus, a single-layered antenna unit layer may be formed so that a thickness of the antenna device may be reduced. Further, the antenna device capable of being applied to a compact sized device and providing a multi-band signaling may be implemented.

The auxiliary radiator 150 and the radiator 120 may include a mesh structure. Accordingly, a transmittance of the antenna unit may be improved, and the antenna unit may be prevented from being visually recognized to a user when being applied to a display device.

In this case, the auxiliary radiator 150 and the radiator 120 may include a mesh structure having substantially the same shape (e.g., the same line width and the same pitch). Thus, the auxiliary radiator 150 and the radiator 120 may include substantially the same conductive material and may be formed through substantially the same etching process.

In exemplary embodiments, the antenna device may satisfy Equation 1 below.

$$0.3<D_2/D_1<0.99 \quad \text{[Equation 1]}$$

In Equation 1, $D_1$ denotes a length of the transmission line, and $D_2$ denotes a length of the auxiliary radiator.

A frequency band at which the antenna device is driven or operated may be disturbed due to a parasitic capacitance generated between the radiator 120 and the pad electrode 145. In this case, the length of the auxiliary radiator 150 may be adjusted as shown in Equation 1, so that the parasitic capacitance component may be used to transmit and receive a signal in a band different from the frequency band set for the radiator 120.

For example, a signal in a higher frequency band than that of the radiator 120 may be transmitted and received using the auxiliary radiator 150. Accordingly, the antenna device that may transmit and receive a multiple band signal while preventing a signal disturbance due to a noise may be provided using a single layered antenna unit layer.

In some embodiments, the antenna device may satisfy Equation 2 below.

$$0.5<D_2/D_1<0.95 \qquad \text{[Equation 2]}$$

In Equation 2, $D_1$ denotes the length of the transmission line, and $D_2$ denotes the length of the auxiliary radiator.

For example, the length of the auxiliary radiator 150 may be a length measured in the first direction. If the antenna device satisfies Equation 2, sufficient radiation efficiency and antenna gain properties may be achieved.

The length of the transmission line 130 in the first direction may be the same as the distance between the radiator 120 and the pad electrode 145.

In one embodiment, a resonance frequency of the auxiliary radiator 150 may be greater than that of the radiator 120. For example, when the resonance frequency of the auxiliary radiator 150 exceeds about 30 GHz, the resonance frequency of the radiator 120 may be from about 20 to 30 GHz.

Figure 3:
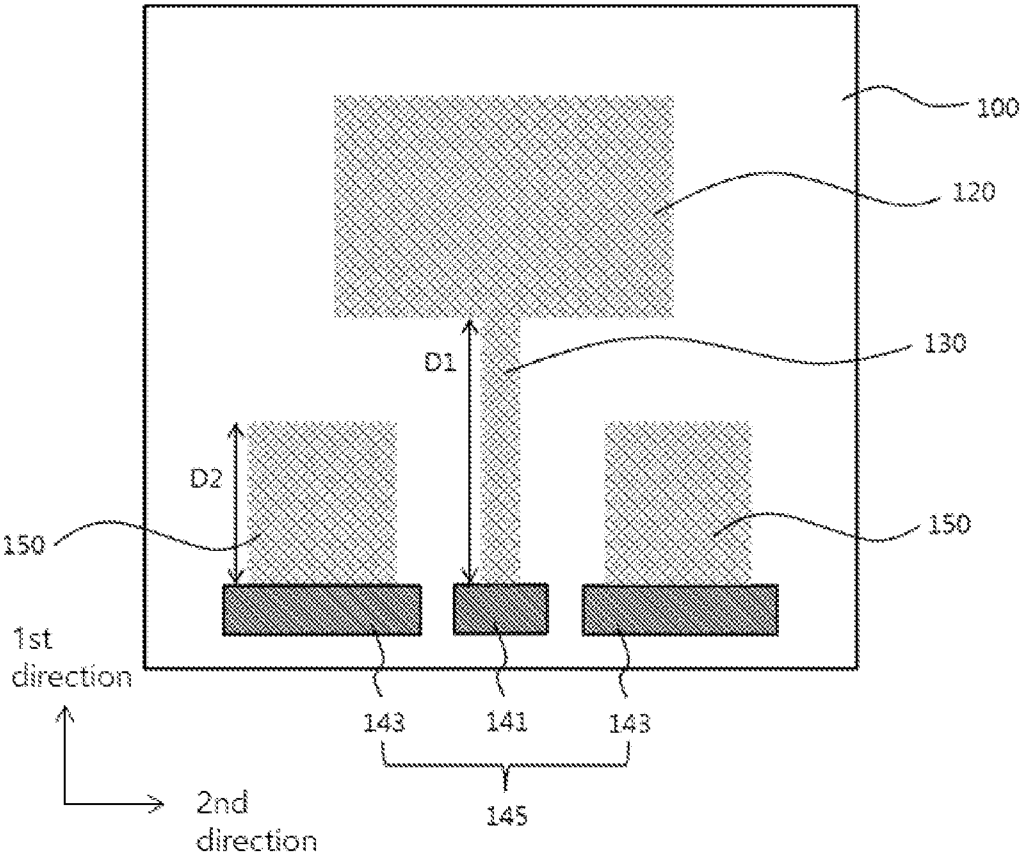
FIGS. 3 to 5 are schematic top planar views illustrating an antenna device in accordance with some exemplary embodiments.
Figure 4:
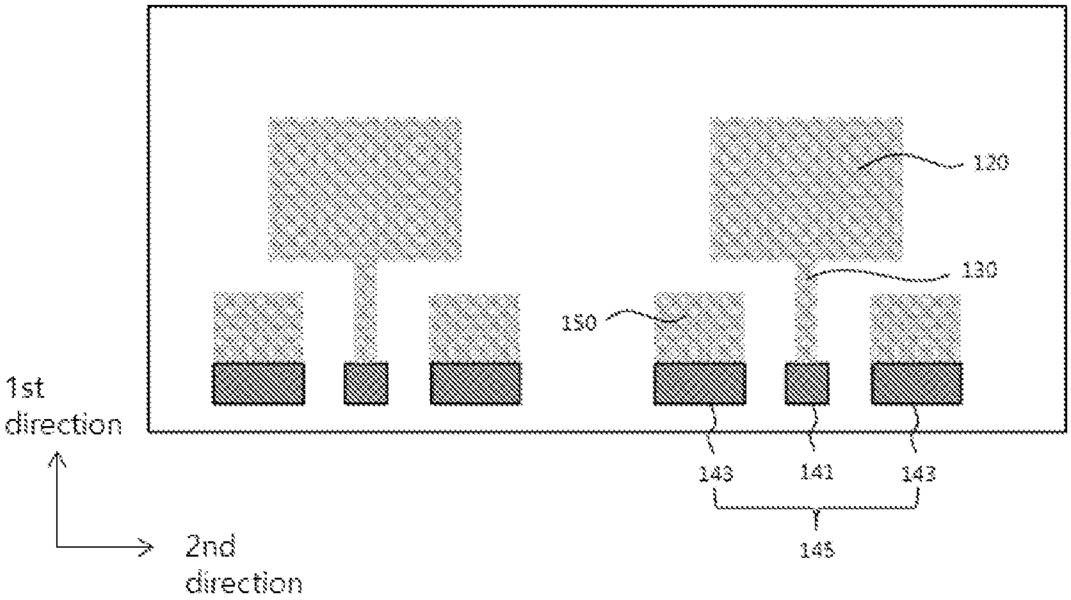
Figure 5:
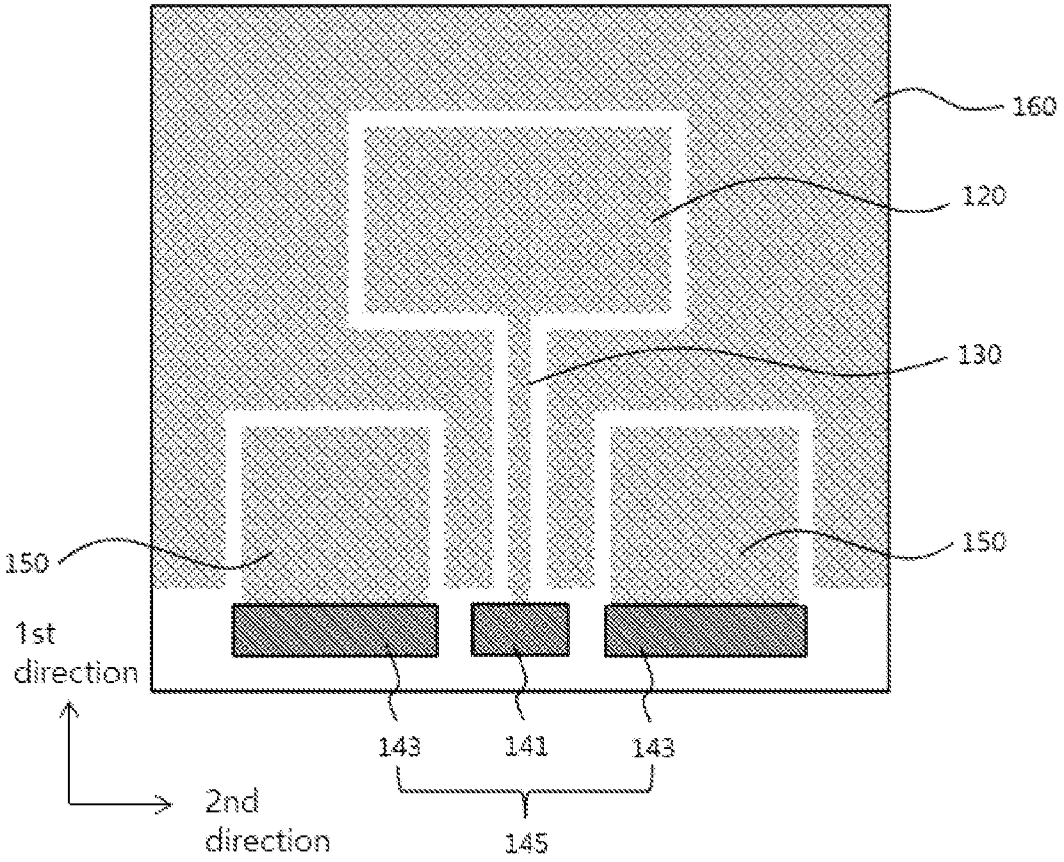

FIGS. 3 to 5 are schematic top planar views illustrating an antenna device in accordance with some exemplary embodiments. Detailed descriptions of structures and elements substantially the same as or similar to those described above with reference to FIGS. 1 and 2 are omitted herein.

Referring to FIG. 3, the antenna device may include a radiator 120, a transmission line 130, a signal pad 141 and a ground pad 143, and may include an auxiliary radiator 150 extending from the ground pad 14 to be parallel to the transmission line 130.

As described with reference to FIG. 2, the antenna device may satisfy Equation 1 or Equation 2. In this case, a width of the auxiliary radiator 150 may be measured in the second direction. The width of the auxiliary radiator 150 may be different from a width of the ground pad 143.

Thus, a capacitance formed between the radiator 120 and the auxiliary radiator 150 may be adjusted, and the capacitance may be utilized for a signal transmission and reception of a desired band. Accordingly, signal interference due to noise may be prevented and a multi-band transmission and reception may be implemented in a thin-layered structure.

Referring to FIG. 4, the antenna device may include a plurality of antenna units in an array form.

For example, the plurality of the antenna units may include antenna units having sensitivities to different frequencies, and thus frequency coverage and gain properties of the antenna device may be increased.

Each of the antenna units may include the radiator 120 and the auxiliary radiator 150. Sizes of the radiator 120 and the auxiliary radiator 150 of each antenna unit may be adjusted to implement the signal transmission and reception of a desired frequency band.

Referring to FIG. 5, if the radiator 120 and the auxiliary radiator 150 include a mesh structure, a dummy mesh pattern 160 may be disposed around the radiator 120 and the auxiliary radiator 150. As described with reference to FIG. 2, the radiator 120 may include the mesh structure so that the transmittance of the antenna device may be improved.

The dummy mesh pattern 160 may be disposed around the radiator 120 and the auxiliary radiator 150, so that a pattern arrangement around the radiator 120 and the auxiliary radiator 150 may become uniform. Thus, the mesh structure or conductive lines included therein may be prevented from being visually recognized by the user of the display device.

For example, a conductive layer may be formed on the dielectric layer 90, and then the conductive layer may be etched to form the mesh structure while etching the conductive layer along a predetermined separation region to form the dummy mesh pattern 160 that is electrically and physically separated from the radiator 120, the transmission line 130 and the auxiliary radiator 150. Accordingly, the antenna unit layer 100 including the above-described antenna units and the dummy mesh pattern 160 may be formed on the top surface of the dielectric layer 90.

The dummy mesh pattern 160 may be electrically separated from an antenna driving integrated circuit chip, and may not provide a substantial radiation driving.

The dummy mesh pattern 160 may include a mesh structure substantially the same as or similar to that of the radiator 120 and the auxiliary radiator 150. Accordingly, the visual recognition of the antenna device due to a deviation in a pattern shape may be prevented while also improving the transmittance of the antenna device.

Figure 6:
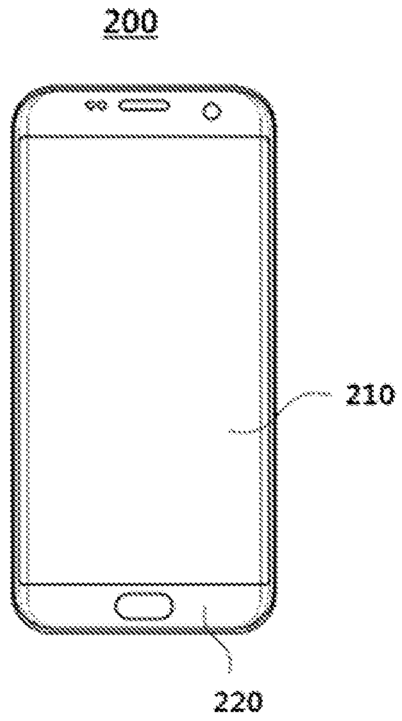
FIG. 6 is a schematic top planar view illustrating a display device in accordance with some exemplary embodiments.

FIG. 6 is a schematic top planar view illustrating a display device in accordance with some exemplary embodiments. For example, FIG. 6 illustrates an outer shape including a window of a display device.

Referring to FIG. 6, a display device 200 may include a display area 210 and a peripheral area 220. For example, the peripheral area 220 may be positioned on both lateral portions and/or both end portions of the display area 210.

In some embodiments, the above-described antenna device may be inserted into the peripheral region 220 of the display device 200 in the form of a patch or film. In some embodiments, the radiator 120 and the auxiliary radiator 150 of the antenna device as described above may be disposed to at least partially correspond to the display area 210 of the display device 200, and the pad electrode 145 may be disposed to correspond to the peripheral area 220 of the display device 200.

The antenna units may be disposed along an outer area of the display device and may be located in the peripheral area 220. For example, the pad electrodes 145 of the antenna unit may be disposed in the peripheral area 220 of the display device.

The peripheral area 220 may correspond to, e.g., a light-shielding portion or a bezel portion of an image display device. Additionally, a driving integrated circuit (IC) chip for controlling driving/radiation properties of the antenna device and supplying a feeding signal may be disposed in the peripheral area 220. In this case, the pad electrode 145 of the antenna device may be adjacent to the driving integrated circuit ship so that a signal transmission/reception path may be shortened, thereby suppressing a signal loss.

In some embodiments, a portion of the radiator 120 and the auxiliary radiator 150 included in the antenna unit may be disposed in the display area 210. For example, as illustrated in FIG. 5, the visibility of the radiator 120 and the auxiliary radiator 150 may be reduced by using a mesh structure.

The antenna unit, or the radiators 120 and the auxiliary radiators 150 may include a mesh structure, so that an overall transmittance of the antenna device may be improved. Further, the dummy mesh pattern may be disposed to improve a pattern uniformity. Accordingly, the visual recognition of the antenna unit due to a pattern deviation may be prevented to the user.

The antenna device according to the above-described exemplary embodiments may be applied to a display device for implementing, e.g., a high frequency or ultra-high frequency band communication and may provide a multi-band signal transmission and reception. The antenna device may be applied to various devices such as a display device and a mobile communication device, or structures such as an automobile and an architecture.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example 1: Evaluation of Signaling Performance While Changing Length of Auxiliary Radiator An antenna unit including copper was formed on a COP dielectric layer. A distance between a radiator and a pad electrode in the antenna unit was fixed as 1.6 mm, and a signal performance (dBi) of the antenna unit was measured while increasing a length of an auxiliary radiator.

Figure 7:
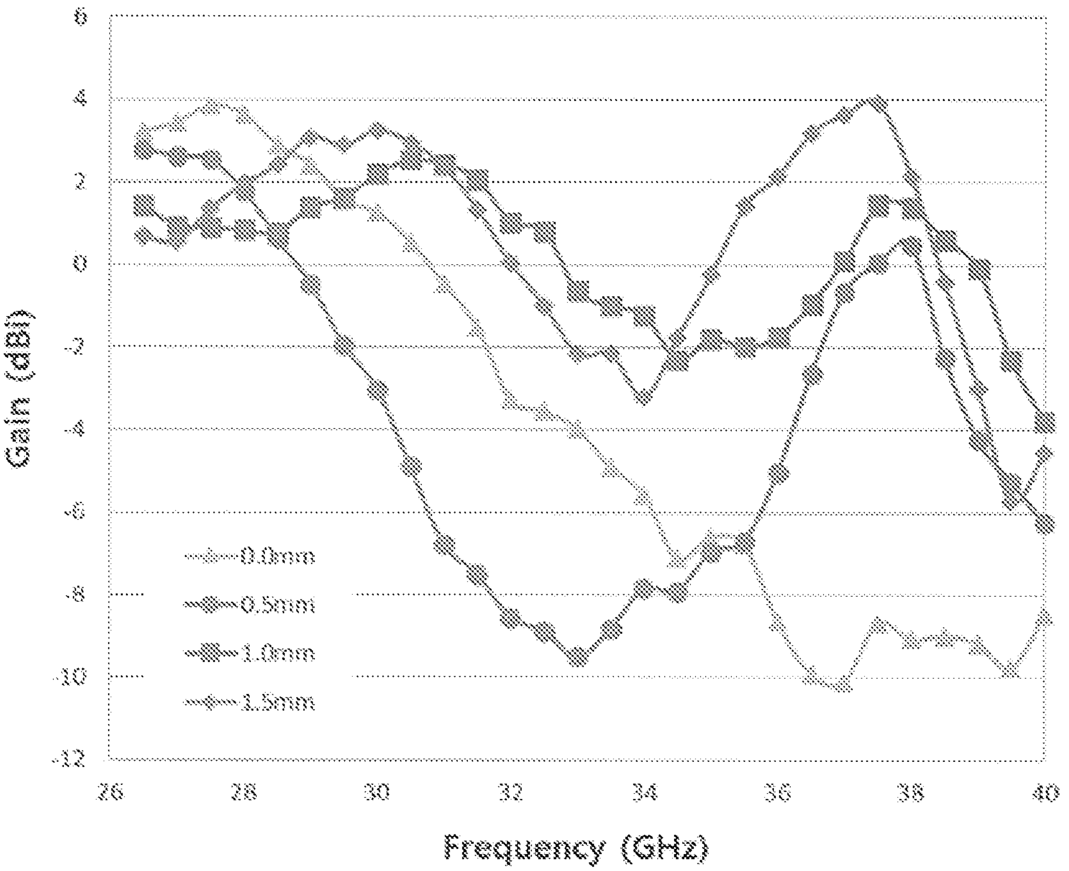
FIG. 7 is a graph showing a change in a gain amount according to a change in a length of an auxiliary radiator of an antenna device in accordance with exemplary embodiments.

Referring to FIG. 7, as the length of the auxiliary radiator increased, a gain amount of a second resonance peak (at s frequency of about 38 GHz) increased. Accordingly, a signal transmission/reception band was extended to the second resonance frequency band to provide improved signaling efficiency.

Experimental Example 2: Evaluation of S11 while Changing Length of Auxiliary Radiator An antenna unit including copper was formed on a COP dielectric layer. A distance between a radiator and a pad electrode in the antenna units was fixed as 1.6 mm, and S-parameter (S11) was extracted at a frequency of about 28.5 GHz using a network analyzer with an impedance of 50Ω while increasing a length of an auxiliary radiator. The simulation result was obtained as a graph shown in FIG. 8.

Figure 8:
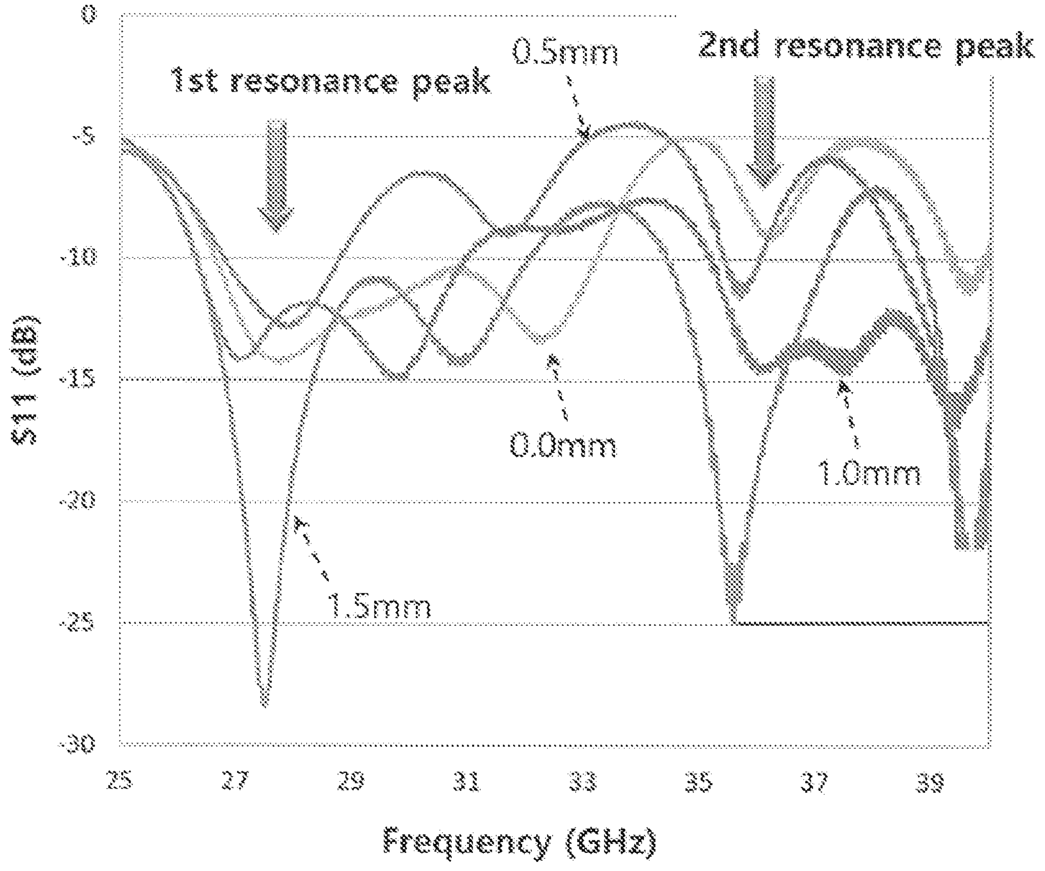
FIG. 8 is a graph showing an S-parameter change according to a change in a length of an auxiliary radiator of an antenna device in accordance with exemplary embodiments.

Referring to FIG. 8, as the length of the auxiliary radiator increased, S11 values of a first resonance peak (at a frequency of about 27 GHz) and a second resonance peak (at a frequency of about 35 GHz) decreased. For example, when the length of the auxiliary radiator was 1.5 mm, a decrease in a reflection loss and an increase in the gain amount were clearly observed.

What is claimed is:

1. An antenna device, comprising:

a dielectric layer;

a radiator disposed on a top surface of the dielectric layer;

a transmission line connected to a side of the radiator on the dielectric layer;

a signal pad connected to an end portion of the transmission line;

a ground pad disposed around the signal pad; and an auxiliary radiator extending from the ground pad to be parallel to the transmission line, wherein the auxiliary radiator has an area larger than that of the ground pad, and the auxiliary radiator has a width smaller than that of the ground pad.

2. The antenna device according to claim 1, wherein the antenna device satisfies Equation 1:

$$0.3<D_2/D_1<0.99 \qquad \text{[Equation 1]}$$

wherein $D_1$ is a length of the transmission line, and $D_2$ is a length of the auxiliary radiator.

3. The antenna device according to claim 1, wherein the auxiliary radiator is electrically and physically separated from the radiator and the transmission line.

4. The antenna device according to claim 1, wherein the ground pad includes a pair of ground pads facing each other with the signal pad interposed therebetween.

5. The antenna device according to claim 4, wherein the auxiliary radiator extends from each of the pair of ground pads.

6. The antenna device according to claim 1, wherein the auxiliary radiator is a single member integrally connected to the ground pad.

7. The antenna device according to claim 6, wherein the auxiliary radiator has the same shape as that of the ground pad, and has an internal structure different from that of the ground pad.

8. The antenna device according to claim 7, wherein the auxiliary radiator has a mesh structure, and the ground pad has a solid pattern structure.

9. The antenna device according to claim 8, further comprising a dummy mesh pattern on the dielectric layer to be disposed around the radiator and the auxiliary radiator.

10. The antenna device according to claim 1, wherein the radiator and the auxiliary radiator are disposed at the same layer.

11. The antenna device according to claim 1, further comprising a ground layer formed on a bottom surface of the dielectric layer.

12. The antenna device according to claim 11, wherein the ground layer covers the auxiliary radiator and the radiator in a planar view with the dielectric layer interposed therebetween.

13. The antenna device element of claim 1, wherein a resonance frequency of the auxiliary radiator is greater than a resonance frequency of the radiator.

14. A display device comprising the antenna device according to claim 1.

* * * * *